Figure 1:
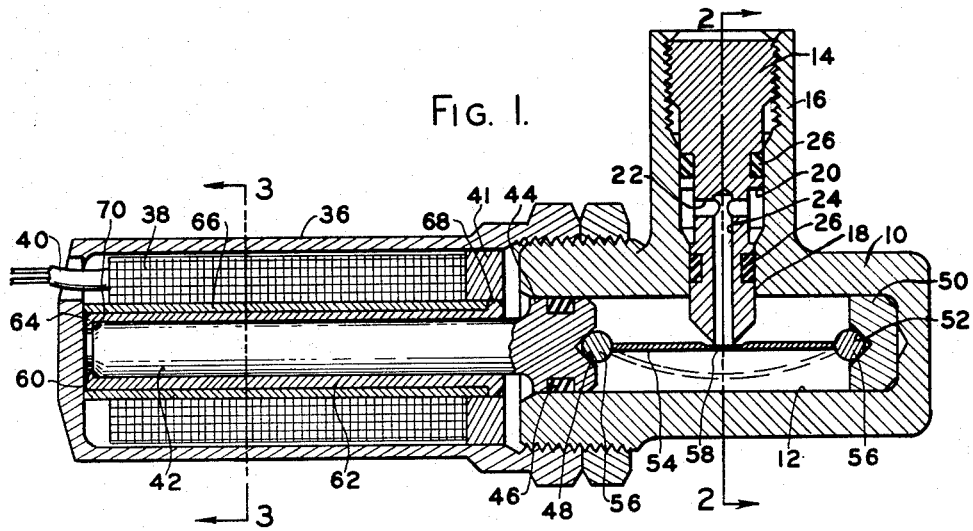

March 23, 1965  J. N. SALTER  3,175,132

MAGNETOSTRICTIVE MOTORING DEVICE

Filed July 15, 1963

INVENTOR.
JACK N. SALTER

BY *Hauke & Hauke*

ATTORNEYS

United States Patent Office 3,175,132
Patented Mar. 23, 1965

3,175,132
MAGNETOSTRICTIVE MOTORING DEVICE
Jack N. Salter, 230 Victory Drive, Pontiac, Mich.
Filed July 15, 1963, Ser. No. 294,860
7 Claims. (Cl. 317—169)

The present invention relates to magnetostrictive devices such as described in my copending application Serial No. 230,394, filed October 15, 1962, and more particularly to such a device having a bimetal constructed displacement means.

As has been described in my aforementioned copending application, magnetostriction refers to the property some metallic materials possess which causes dimensional changes to be produced in the material when the material is placed in a magnetic field. Magnetostrictive metals and their alloys differ both as to magnitude and direction of magnetostriction. Some for instance contract when subjected to a magnetic field while others expand. Metals which contract are said to have a negative magnetostrictive characteristic while those which expand are classified as positive magnetostrictive materials.

The aforementioned copending application discloses and claims a motoring device utilizing a magnetostrictive displacement member and a means of multiplying dimensional changes produced in the displacement member. The present invention provides a motoring device which utilizes a displacement member constructed of two or more different metals having opposite signs of magnetostriction and arranged in such a way that displacement in one direction only is produced upon energization of an electromagnetic coil. In this way the ratio of the movement of the displacement member with respect to its length can be greatly increased producing a small compact motoring device.

It is an object then of the present invention to increase the utility of magnetostrictive motoring devices by providing a means increasing the ratio of displacement of the magnetostrictive member of such devices with respect to the length of such member.

It is another object of the present invention to increase the ratio of displacement of a magnetostrictive member when subjected to a given magnetic force with respect to its length by providing a bi-metallic displacement member constructed of metals having opposite signs of magnetostriction and assembled in such a way that contraction of the portion having the negative characteristic and the expansion of the portion having a positive characteristic are directed to produce a linear dimensional change in substantially one direction only.

It is still another object of the present invention to decrease the effects of thermal expansion of bimetallic magnetostrictive displacement members by constructing such members in a way in which the expansion of each of the different metals is substantially cancelled by an expansion of a portion of the member constructed of a different metal.

Still further objects and advantages of the present invention will readily occur to one skilled in the art to which the invention pertains upon reference to the following drawings in which like reference characters refer to like parts throughout the several views and in which FIG. 1 is a longitudinal cross sectional view of a device utilizing the magnetostrictive motor of the present invention.

Figure 2:
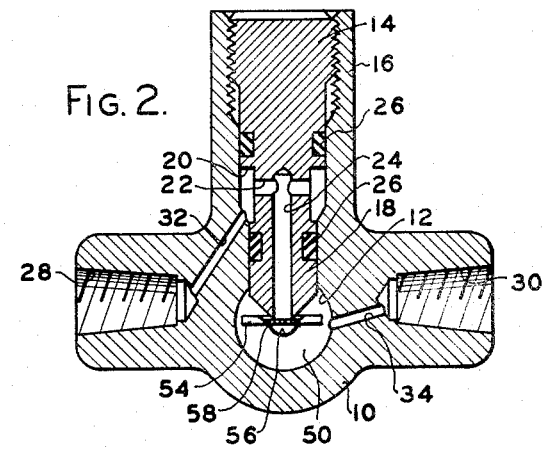
Figure 3:
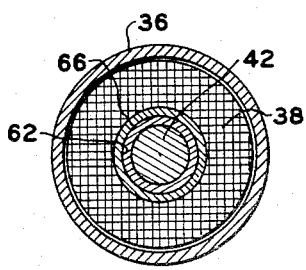

FIG. 2 is a lateral cross sectional view as seen substantially from line 2—2 of FIG. 1, and FIG. 3 is a lateral cross sectional view as seen substantially from line 3—3 of FIG. 1.

Now referring to the drawings for a more detailed description of the present invention, a preferred device is illustrated as comprising a substantially cylindrical housing 10. The housing 10 is provided with an axially extending chamber 12. A threaded plug 14 is received by an internally threaded boss 16. The plug 14 is provided with a nozzle portion 18 extending into the chamber 12. The plug 14 is further provided with an annular recess 20 and a transverse passage 22 in communication therewith. The passage 22 communicates with an axially extending passage 24 provided in the nozzle portion 18 and opening to the chamber 12. Annular seals 26 are provided to prevent fluid leakage between the plug 14 and the boss portion 16.

As can best be seen in FIG. 2 the housing 10 is also provided with a pressure port 28 adapted for connection with a source of fluid under pressure (not shown) and an outlet port 30. The pressure port 28 is connected with the annular recess 20 by a passage 32 provided in the housing 10 and the outlet port 34 is connected with the chamber 12 by a passage 34 provided in the housing 10.

A substantially cylindrical end housing member 36 is adapted to be threaded onto one end of the housing 10 in substantially axial alignment therewith. An electromagnetic coil 38 is carried in the housing member 36 and is adapted for connection with a source of electrical energy (not shown) by leads 40. A spacer 41 positions the coil 38. The coil 38 encompasses a magnetostrictive displacement rod member 42 which has one end normally abutting the housing member 36 and an enlarged end portion 44 which is axially slidably carried by the walls of the housing 10, defining chamber 12. A seal 46 is carried by the enlarged end portion 44 to prevent fluid leakage from the chamber 12.

A conical recess 48 is provided on the end of the enlarged portion 44 disposed in the chamber 12 and a seat member 50 secured in the opposite end of the chamber 12 is provided with a similar conical recess 52 in axial alignment with the recess 48. An elongated resilient bow spring member 54 is preferably provided with spherical shaped end portions 56 which engage in the recesses 48 and 52. The bow spring member 54 is preferably provided with a medial portion 58 formed by providing a longitudinal recess in the upper surface and the side edges of the member 54 as can be seen in FIGS. 1–2. The medial portion 58 is normally positioned closely adjacent the nozzle portion 18 to block fluid flow from the passage 24.

The displacement rod member 42 is provided with an annular recess 60 at the end adjacent the housing member 36 as can best be seen in FIG. 1. A first tubular member 62 encompasses a portion of the rod member 42 and is provided with a radially inwardly extending flange portion 64 which seats in the recess 60. A second tubular member 66 encompasses the first tubular member 62 and is positioned between the end of the housing member 36 and a radially outwardly extending flange portion 68 provided on the end of the tubular member 62 opposite the flange portion 64.

Although it has been preferred to describe the end portions 56 as being spherical, it is apparent that these could also be in the shape of cylinders having their longitudinal axes normal to the longitudinal axes of the bow spring member 54. The recesses 48 and 52 would then be in the form of elongated V-shaped grooves.

In the particular construction shown the rod member 42 and the second tubular member 66 are preferably constructed of a material which expands when subjected to a magnetic field such as a cobalt iron alloy and the housing member 36 and the first tubular member 62 are constructed of a material which contracts when subjected to a magnetic force such as pure nickel. As the coil 38 is energized to produce a magnetic field, a number of expansions and contractions will take place substantially instantaneously and simultaneously. The housing member 36 will contract and thereby exert an axial force on the end of the rod member 42 moving the rod member 42 axially a short distance toward the chamber 12. The second tubular member 66 will expand exerting an axial force against the flange 68 of the tubular member 62. This force will be transmitted to the rod member 42 through the flange portion 64 to axially move the rod member 42 farther toward the chamber 12. The first tubular member 62 being nickel will contract and since the tubular member 66 abutting the flange portion 68 will prevent contraction in that area, the contraction will be transmitted by the flange portion 64 to the rod member 42 to move the rod member 42 farther into the chamber 12. Finally, the rod member 42 being constructed of a positive magnetostrictive material will expand producing a displacement of the end portion 44 even farther into the chamber 12. In this way, the small displacements of each of the magnetostrictive members are accumulated and transmitted to produce a substantial displacement of the end portion 44 toward the seat member 50.

This displacement produces an axial force against the end portion 56 of the bow spring member 54. This will cause the bow spring member 54 to move toward the arcuate or bowed position illustrated by dotted lines in FIG. 1 to open the passage 24 to the chamber 12 and to thereby open fluid flow from the pressure port 28 to the outlet port 30. The shape of the medial portion 58 determines the direction the spring will bow and if it is desired to produce an upward bowing upon the exertion of an axial force, the recessed portion would be provided on the lower surface.

It is apparent that although it has been preferred to describe the motoring device of the present invention as being used to open and close nozzle 18 that other uses can be made of this device and it is not intended to limit the present invention to the particular use illustrated.

In constructing a bi-metallic displacement member such as herein described, it has been found that care must be taken to compensate for the expansion of the members caused by the heat produced by the coil. In the particular construction of the present invention the particular metals chosen have substantially the same coefficient of expansion and the members are arranged such that thermal expansion of the members produces very little effect on the position of the rod member 42.

To illustrate this thermal expansion of the housing member 36 tends to move the end of the housing member 36 out of abutting engagement with the rod member 42. This provides a space between the end of the housing member 36 and the members 62, 66 and 42 into which these members can expand. In addition, the tubular member 62 is secured to the rod member 42 preferably by a press fit as at 70 so that the tendency of the end portion 44 to move into the chamber 12 upon thermal expansion of the rod member 42 is offset by the expansion of the tubular member 62 toward the closed end of the housing member 36.

It is apparent that although I have described but one embodiment of the present invention other modifications and changes can be made without departing from the spirit of the invention or the scope of the appended claims.

I claim:
1. A motoring device comprising
   (a) a magnetostrictive displacement means,
   (b) means selectively operable to magnetize said displacement means,
   (c) said displacement means comprising an elongated member and a tubular member encompassing said elongated member,
   (d) said elongated member and said tubular member having opposite signs of magnetostriction and being operably connected one to the other at one end only and
   (e) means limiting displacement of one of said members at the end adjacent the connection of said members and means limiting displacement of the other of said members at the end opposite the connection whereby when said displacement means is magnetized displacement is produced in one axial direction only.

2. The motoring device as defined in claim 1 and including
   (a) an elongated bow spring having its ends in a normally fixed relationship,
   (b) at least one of said ends being operably connected to one of said members whereby as magnetic force is applied to said displacement means dimensional changes produced in said displacement means will vary the space between said ends.

3. The motoring device as defined in claim 2 and in which said magnetizing means comprises an electromagnetic coil encompassing a portion of said displacement means, said coil being adapted for connection with a source of electrical power.

4. A motoring device comprising
   (a) a housing having a chamber,
   (b) a magnetostrictive displacement means carried in said chamber,
   (c) means carried in said chamber and being selectively operable to magnetize said displacement means,
   (d) actuator means engaged by said displacement means and movable in response to dimensional changes produced in said displacement means,
   (e) said displacement means comprising an elongated central member and a tubular member encompassing said central member,
   (f) said members having opposite signs of magnetostriction,
   (g) said central member having an end abutting said housing,
   (h) means connecting said central member and said tubular member adjacent said abutting end of said central member,
   (i) means limiting displacement of said tubular member at the end opposite the connection with said central member whereby as said magnetizing means are actuated displacement of said tubular member is transmitted through the connection to increase the displacement of said central member.

5. The device as defined in claim 4 and in which said displacement limiting means comprises
   (a) a radially outwardly extending flange portion provided at the free end of said tubular member,
   (b) a second tubular member encompassing said first mentioned tubular member and having one end abutting said housing and the other end abutting said flange portion.

6. The motoring device as defined in claim 5 and in which said second tubular member is constructed of a magnetostrictive material having an opposite sign of magnetostriction from that of said first tubular member.

7. The motoring device as defined in claim 6 and in which said housing is constructed of a magnetostrictive material having an opposite sign of magnetostriction from that of said second tubular member.

No references cited.